Sept. 10, 1940.  A. S. HAGAN  2,214,671
METHOD OF AND APPARATUS FOR CLAY TREATING
Filed Dec. 6, 1938
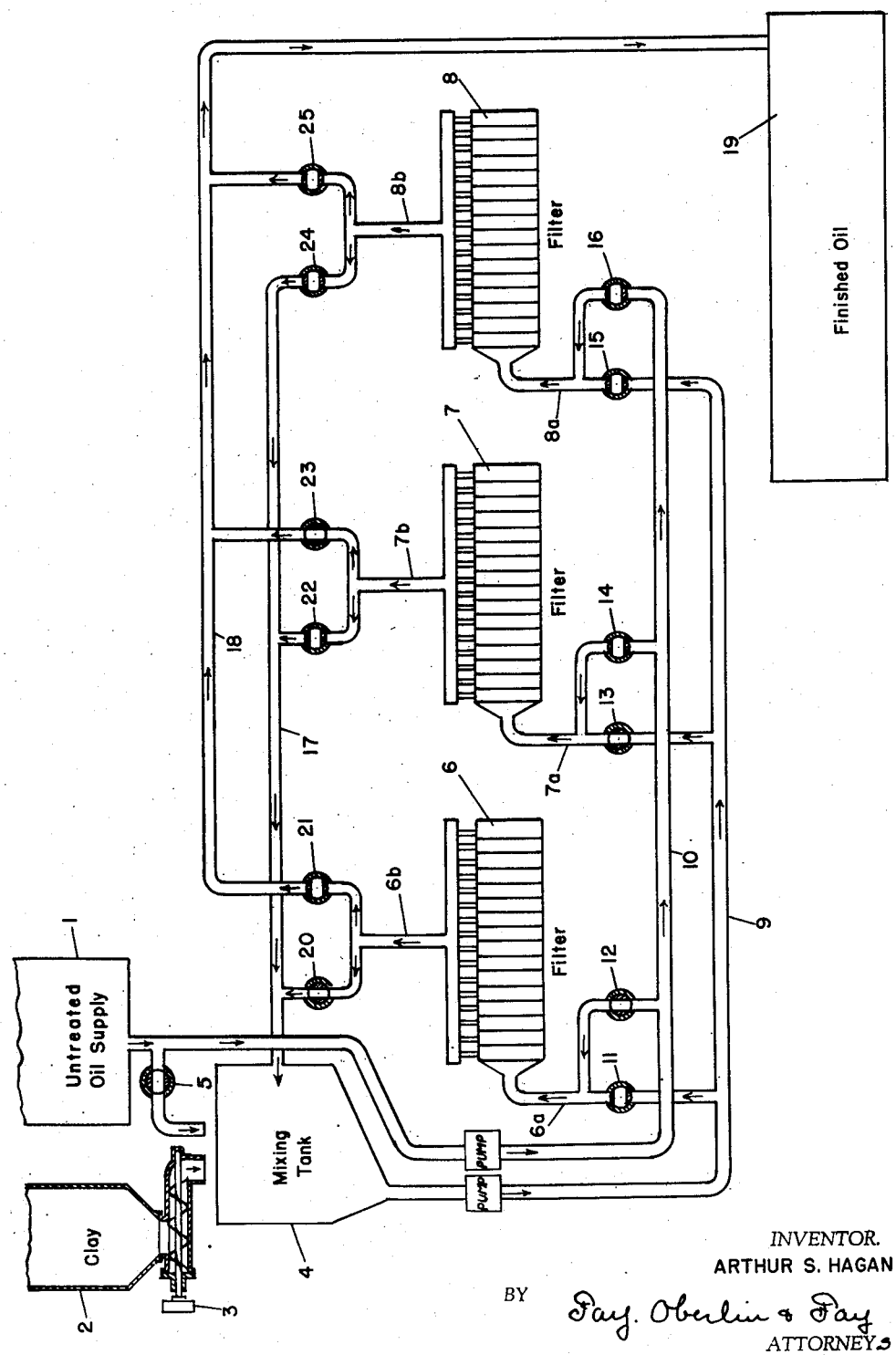
INVENTOR.
ARTHUR S. HAGAN
BY Fay, Oberlin & Fay
ATTORNEYS Patented Sept. 10, 1940

2,214,671

UNITED STATES PATENT OFFICE 2,214,671

METHOD OF AND APPARATUS FOR CLAY TREATING

Arthur S. Hagan, Butler, Pa., assignor to Mead Cornell, Cleveland, Ohio

Application December 6, 1938, Serial No. 244,209

5 Claims. (Cl. 210—177)

This invention relates as indicated to the method of and apparatus for clay-treating and more particularly, to the art of de-colorizing or similarly treating oil as by treating the same with an adsorbent material such as clay, fuller's earth, etc.

It is a principal object of my invention to provide a method of and apparatus for de-colorizing and similarly treating oils characterized by the fact that the adsorbent or treating material employed is used to greater advantage and when employing my process, the capacity of conventional apparatus now employed for this purpose may be very substantially increased.

In de-colorizing oils such as mineral oil fractions, it is common practice to mix a predetermined amount of adsorbent clay with the oil to form a slurry and to then separate the treated oil from the slurry in a filter press. It is a further and more particular object of my invention to provide a method of and apparatus for de-colorizing oils which makes use of the unexpended properties of the clay thus separated from the slurry to the end that less clay per unit volume of oil is required, thus reducing the cost of operation and increasing the capacity of conventional apparatus, thus further decreasing the cost of operation.

Other objects of the invention will appear as the description proceeds.

To the accomplishment of the foregoing and related ends, said invention, then, consists of the means hereinafter fully described and particularly pointed out in the claims, the annexed drawing and the following description setting forth in detail certain means and one mode of carrying out the invention, such disclosed means and mode illustrating, however, but one of various ways in which the principle of the invention may be used.

In said annexed drawing, the single figure is a diagrammatic representation of apparatus constructed in accordance with the principles of my invention and capable of carrying out the process comprising my invention.

Referring now more particularly to the drawing, it will be observed that the ordinal 1 indicates a supply such as a tank of untreated oil which is to be de-colorized. The supply 1 has been indicated as a tank; however, it is to be understood that such supply may be a conduit leading directly from refining equipment capable of providing a substantially continuous supply of oil to be treated.

The oil to be treated and which is delivered by the supply 1 may be any suitable oil such as of mineral, animal, vegetable origin and which requires to be de-colorized as by the treatment with an adsorbent material such as clay, fuller's earth, etc.

In the drawing, all pumps necessary for the circulation of the oil through the system have been omitted in order to simplify the illustration. The location of the necessary pumps will be apparent to those skilled in the art so that reference to the pumps, as well as their location in the system will be omitted in the following description of my invention:

The ordinal 2 denotes a supply means for the treating material such as clay and in order to facilitate the feeding of the clay at a uniform and controlled rate, the supply means 2 may be provided with a feeding screw generally indicated at 3.

The ordinal 4 denotes a mixing tank to which predetermined and regulated amounts of untreated oil and clay are fed. The rate of feed of the clay may be regulated by means of the feeder 3 and the rate of feed of the untreated oil may be regulated by means of the valve 5. The material contained in the mixing tank 4 may be agitated by any suitable means as by the inclusion therein of a mechanical stirrer or by a recirculation of the contents of the mixing tank as is customary in illustrations of this type.

The method and apparatus comprising my invention includes the use of conventional filters such as, for example, the filter presses diagrammatically illustrated at 6, 7 and 8.

My invention may be practiced to advantage even when only one filter press is available; although the advantages of my invention are realized to the fullest extent when at least two and preferably three or more filter presses are available.

The inlet lines to filter presses 6, 7 and 8 are indicated at 6a, 7a and 8a, respectively, and the outlet conduits from such presses are indicated by 6b, 7b and 8b, respectively.

A supply line 9 extends to each of the presses from the mixing tank 4 and another supply line 10 extends from the untreated oil supply 1 to each of the filter presses. The branched lines from each of these supply lines to the filter presses are provided with valves and in order to facilitate their identification, they are indicated by the ordinals 11, 12, 13, 14, 15 and 16 as shown.

From the discharge sides of the filter presses are provided return conduits 17 and 18, the former, connecting the discharge sides of the filter presses to the mixing tank and the latter connecting the discharge sides of the filter presses to a storage reservoir 19 for the finished oil.

The branched conduits by which the discharge sides of the several filter presses are connected to the last-named return conduits, are likewise provided with separate valves which for purposes of facilitating their identification are indicated by the ordinals 20, 21, 22, 23, 24 and 25, as shown. Arrows have been placed on the several conduits to indicate the direction of normal flow of the oil or oil mixture therethrough, the arrows on the conduits which are blocked by closed valves indicating the direction of passage of material therethrough when such valves are opened.

In carrying out the process comprising my invention we first assume that the apparatus is placed in operation for the first time. The untreated oil supply (and such untreated oil will preferably be heated in order to increase the efficiency of the contact reaction with the clay) and the clay supply are so adjusted that the amount of clay and oil introduced to the mixing tank is in such proportion that the clay, when mixed with the oil, will de-colorize the latter so that in order to produce an oil of specified color, the clay and oil need merely be separated. As is well known to those familiar with plants of this character, heated and preferably untreated oil is first circulated through the entire system so as to bring it up to operating temperature before the clay-oil slurry is fed through the system and introduced to the first filter press.

Assuming that the apparatus has now thus been conditioned by pre-heating, the valves to presses 7 and 8 will be closed and the valves 21 and 12 will be likewise closed, leaving valves 11 and 20 the only ones associated with the filter presses which are open. The oil-clay slurry is then pumped or fed by gravity into the filter press 6. The first oil discharged from the filter press 6 will carry a slight amount of clay therewith so that such oil will be returned to the mixing tank by virtue of the valve 20 being open. As soon, however, as a bed of clay of sufficient thickness is built up in the filter press 6 so that clear oil is discharged therefrom, the valve 20 is closed and the valve 21 opened, so that the clear oil coming from the press 6 passes through the conduit 18 into the reservoir 19.

This flow of clay-oil slurry from the mixing tank is then maintained through filter press 6 until a clay bed is built up in the filter 6 of such proportions that such clay bed may act as a percolating treating bed. Instead of continuing the further circulation of clay-oil slurry which would ultimately build up a cake so thick as to make impossible the ready circulation of oil through the bed, the valve 11 is now closed and the valve 12 immediately opened so that the oil subsequently circulated through the filter 6 is received directly from the untreated oil supply, i. e., it does not contain any clay. Care should be observed in manipulation of the valves 11 and 12 in the manner explained so that the change from one source of supply to the other may be effected without any substantial variation in pressure in the conduit 6a. This care should be observed in order that the cake or bed of clay which has been built up in the filter press will not be materially disturbed when changing from the oil-clay slurry over to the untreated oil.

The filter 6 may then be operated for an appreciable length of time on raw untreated oil and the clay bed therein acts as a percolating contact layer removing sufficient color from the oil so that the oil discharged from the filter press 6 will be up to specification. This oil may, therefore, be run through conduit 18 into the reservoir 19.

As soon as the clay bed in filter 6 begins to lose its effectiveness as a treating medium so that the raw oil pumped therethrough from the supply 1 as discharged through the conduit 6b falls off color, the valve 21 is closed and the valve 20 opened so that the off-color oil is pumped back into the mixing tank. Circulation of the untreated oil through filter 6 is, however, continued even after the oil falls off-color and such flow of untreated oil through the filter 6 is continued until there is substantially no difference between the color of the discharged oil and the color of the introduced oil, thus showing that the clay bed in the press 6 has lost substantially all of its effectiveness in removing color from the oil. After the clay bed has been thus saturated, the press is opened and cleaned and is, therefore, ready to repeat the cycle of operations just described.

In the foregoing description, I have indicated that when the press is changed over so that it received raw untreated oil instead of oil from the mixing tank 4, the oil discharged from the press 6, for some time at least after such change-over may be delivered directly to the finished oil reservoir 19. If this procedure is followed, care must be observed, of course, that the valves 20 and 21 are changed at the right moment so that no off-color oil passes to the storage reservoir 19. In order to make unnecessary this close observation, it is entirely practical to return to the mixing tank 4 all of the oil discharged by the press 6 after the same is changed over, so that all untreated oil which is circulated through the percolating clay beds in the filter 6 will pass back to the mixing tank 4 to dilute the amount of untreated oil which is mixed with clay and introduced to the next filter. When partially or totally de-colorized oil is thus pumped back into the mixing tank 4, the rate of clay supply to the tank 4 may be correspondingly decreased in proportion to the amount of color which has already been removed from the oil which is introduced to the mixing tank.

As previously indicated, the advantages of my process may be most fully realized when a plurality of filter presses are available for use. The following is the manner in which a plurality of filter presses are employed.

As soon as the valve 11 is closed and the valve 12 opened during the operation of filter 6, as above explained, i. e., when the supply of clay-oil slurry to the press 6 is cut off and the press fed with untreated oil, then the next press 7 may be placed in operation as by opening the valve 13 and closing the valve 14.

As explained in connection with the operation of press 6 the valve 22 will be kept open for a short while at least after the press 7 is started until clear oil begins to come through, after which, valve 22 is closed and valve 23 opened and the clear oil fed to the finished oil reservoir 19.

By the time the clay bed in press 6 has become saturated a percolating clay bed will have been built up in press 7 so that it may be changed over to operate on untreated oil similarly to the manner in which press 6 was changed over and concurrently press 8 may be placed in operation in the same manner as each of presses 6 and 7 were placed in operation. By the time the percolating clay bed in press 6 has become saturated, presses 7 and 8 will be in operation so that press 6 may be immediately opened and cleaned and made ready to be placed in operation as soon as press 8 is ready to be changed over; thus maintaining a continuous cycle of operation with two presses in operation substantially all of the time and one of such presses receiving oil-clay slurry and the other receiving untreated oil.

In order to facilitate the description of the invention in the appended claims, I use the term "primary run" to define the circulation of the clay-oil slurry through the filter press and the term "secondary run" as the circulation of the untreated oil through the press in which the percolating clay filter bed had been built up.

From the foregoing description, it will be observed that all of the clay is fully and completely saturated with coloring matter before it is removed from the filter presses. The advantages of this fact, as well as the advantages of other features of the process will be apparent to those familiar with the art.

As an indication of the lengths of time and other variables which may be encountered in the operation of the apparatus in accordance with the process of my invention, the following is actual data which has been determined by the operation of the process on steam refined cylinder stock from Penna. crude oil such stock having a viscosity of 125 seconds Saybolt Universal at 210° F. The raw stock, i. e., before being admixed with clay, is maintained at a temperature of about 400° F., so that after being admixed with clay the temperature of the mixture is about 350° F. The clay which has been used is commercial Magnesol clay of a fineness such as that approximately 85% will pass through a 200 mesh screen. The filter presses which were employed are those well-known as No. 10 Sweetland presses.

The clay and oil are mixed on the order of about 250 lbs. of clay per 700 gals. of oil. The slurry thus produced will require about 10 minutes circulation through a filter press before a sufficient cake is built up so that clear oil is produced which may be run into the finished oil reservoir 19. The clay-oil slurry may then be fed through the Sweetland press for a period of about one hour at the end of which time it will be observed, by having reference to the pressure on the inlet side of the press, that a cake of proper proportions to be used as a percolating bed has been built up. The change-over is then made from oil-clay slurry to untreated oil and the untreated oil circulated through the clay bed for a period of about 2 to 2½ hours before the clay bed becomes saturated. The raw oil which passes through the percolating bed for the first 15 to 30 minutes after the change-over will be found to be sufficiently de-colorized so that it may be run directly into the finished oil reservoir.

The foregoing is merely illustrative of the type of conditions which may be maintained during the practice of the process comprising my invention; however, as will be immediately apparent to those familiar with the art, changes in temperature, rate of through-put, type of clay used, as well as the type of raw stock, will require changes which may be made very readily by those familiar with the art in order that the process may be operated at maximum efficiency.

While not illustrated in the drawing, nor specifically referred to in the foregoing description of my invention, it will be observed that as is customary in the art, the oil discharged through the out-fall conduit 18 will preferably be passed through a blotter press before it is discharged into the finished oil reservoir 19, in order to remove any finely divided material which may be entrained therein.

Other modes of applying the principle of my invention may be employed instead of the one explained, change being made as regards the means and the steps herein disclosed, provided those stated by any of the following claims or their equivalent be employed.

I, therefore, particularly point out and distinctly claim as my invention:

1. The process for decolorizing oil to a particular color standard which comprises making a slurry of the oil and color absorbent material, using a sufficient amount of said material such that upon mere separation of the material and oil, the separated oil meets said particular color standard, passing said slurry, as a primary run, through a filter to simultaneously separate the oil from the material and build up a treating bed, passing the major portion of the separated oil to storage, stopping the circulation of said slurry, and then as a secondary run passing untreated oil only, through said filter until the bed therein is substantially ineffective to remove any color from such untreated oil, and utilizing the off color oil resulting from the latter portion of said secondary run as a constituent of said slurry in said primary run.

2. In a process of decolorizing oil, the steps of forming a slurry of said oil and color absorbent material, passing said slurry through a filter to simultaneously build up a treating bed and separate said oil from said absorbent material, passing the major portion of the separated oil to storage, then stopping the passage of said slurry through said filter and then passing said oil only through said filter and thence to storage, continuing said passage of oil only until the bed in said filter is substantially ineffective to remove any color from said oil and utilizing the off color oil from the latter portion of said continuing passage as a constituent of said slurry in said first passing.

3. The process for decolorizing oil to a particular color standard which comprises employing a plurality of separate filters, making a slurry of the oil and color absorbent material in a mixing tank, using a sufficient amount of said material such that upon mere separation of the material and oil, the separated oil meets said particular color standard, sequentially operating said filters during a primary run by passing said slurry therethrough to simultaneously separate the oil from the material and build up a treating bed, collecting from each filter, as finished oil, the major proportion of the oil discharged therefrom during said primary run, without disturbing the treating bed built up in each filter during said primary run, sequentially operating said filters during a secondary run by passing untreated oil through each filter until the bed therein is substantially ineffective to remove any color from the latter portion of such untreated oil and collecting as finished oil the first part of the oil discharged from each filter during said secondary run and directing the remainder to said mixing tank as a constituent of a primary run, and sequentially cleaning said filters after the secondary run, the intervals of operation during the primary and secondary runs being such that at all times at least one filter is operating on a primary run and another filter is operating on a secondary run.

4. The process for decolorizing oil to a particular color standard which comprises making a slurry of the oil and color absorbent material in a mixing tank, using a sufficient amount of said material such that upon mere separation of the material and oil, the separated oil meets said particular color standard, passing said slurry, as a primary run, through a filter to simultaneously separate the oil from the material and build up a treating bed, passing the major portion of the separated oil to storage, stopping the circulation of said slurry, and then as a secondary run passing untreated oil only, through said filter and then directing all of the oil from said secondary run to said mixing tank, to form a constituent of said slurry in said primary run.

5. The process for decolorizing oil to a particular color standard which comprises employing a plurality of separate filters, making a slurry of the oil and color absorbent material in a mixing tank, using a sufficient amount of said material such that upon mere separation of the material and oil, the separated oil meets said particular color standard, sequentially operating said filters during a primary run by passing sad slurry therethrough to simultaneously separate the oil from the material and build up a treating bed, passing the major portion of the separated oil to storage, sequentially operating said filters during a secondary run by passing untreated oil only through each filter until the bed therein is substantially ineffective to remove any color from the latter portion of such untreated oil and directing all of the oil, discharged from each filter during the secondary run, to said mixing tank to constitute the oil of the primary run for each succeeding filter, and sequentially cleaning said filters after the secondary run, the intervals of operation during the primary and secondary runs being such that at all times at least one filter is operating on a primary run and another filter is operating on a secondary run.

ARTHUR S. HAGAN.